United States Patent [19]
Kohler et al.

[11] Patent Number: 4,661,038
[45] Date of Patent: Apr. 28, 1987

[54] PROTECTION ARRANGEMENT FOR INDUSTRIAL ROBOTICS

[75] Inventors: Gerd Kohler; Rudolf Burger, both of Munich, Fed. Rep. of Germany

[73] Assignee: Siemens Aktiengesellschaft, Berlin and Munich, Fed. Rep. of Germany

[21] Appl. No.: 765,779

[22] Filed: Aug. 15, 1985

[30] Foreign Application Priority Data

Oct. 9, 1984 [DE] Fed. Rep. of Germany ....... 3437036

[51] Int. Cl.$^4$ ............................................... B66C 1/00
[52] U.S. Cl. ..................................... 414/730; 901/49; 248/900
[58] Field of Search ................ 414/730, 735; 248/549, 248/900; 901/29, 49, 41, 44, 45

[56] References Cited

U.S. PATENT DOCUMENTS

| | | | |
|---|---|---|---|
| 2,724,996 | 11/1955 | O'Shei | 248/900 X |
| 4,514,616 | 4/1985 | Warner | 901/49 X |
| 4,540,331 | 9/1985 | Stanner et al. | 414/730 |

FOREIGN PATENT DOCUMENTS

| | | | |
|---|---|---|---|
| 3241132 | 5/1984 | Fed. Rep. of Germany | 901/49 |
| 3333979 | 4/1985 | Fed. Rep. of Germany | |
| 0216892 | 1/1985 | German Democratic Rep. | |
| 855251 | 11/1960 | United Kingdom | 248/900 |
| 2068891 | 8/1981 | United Kingdom | |

*Primary Examiner*—L. J. Paperner
*Assistant Examiner*—Jay I. Alexander
*Attorney, Agent, or Firm*—John Francis Moran

[57] ABSTRACT

A protection arrangement for industrial robotics and other applications reacts to torsion moments and pressure forces in addition to bending moments and traction forces acting upon the flange of the industrial robotics. In the protection arrangement, a protection flange (1) is pulled or held in compression against pins (6) arranged on a divided circle with the tie rod (2) by means of springs (3). On the left end of the tie rod (2) an activating element (10) has been arranged, pressed against a sliding member (12) and/or activating levers (17) by means of spring (11). Upon shifting the activating element (10), a switch (13) is activated for deactivating the industrial robots. This protection arrangement provides mechanical protection for the gripper in addition to the conventional fuse electrical protection for the activating drives.

6 Claims, 1 Drawing Figure

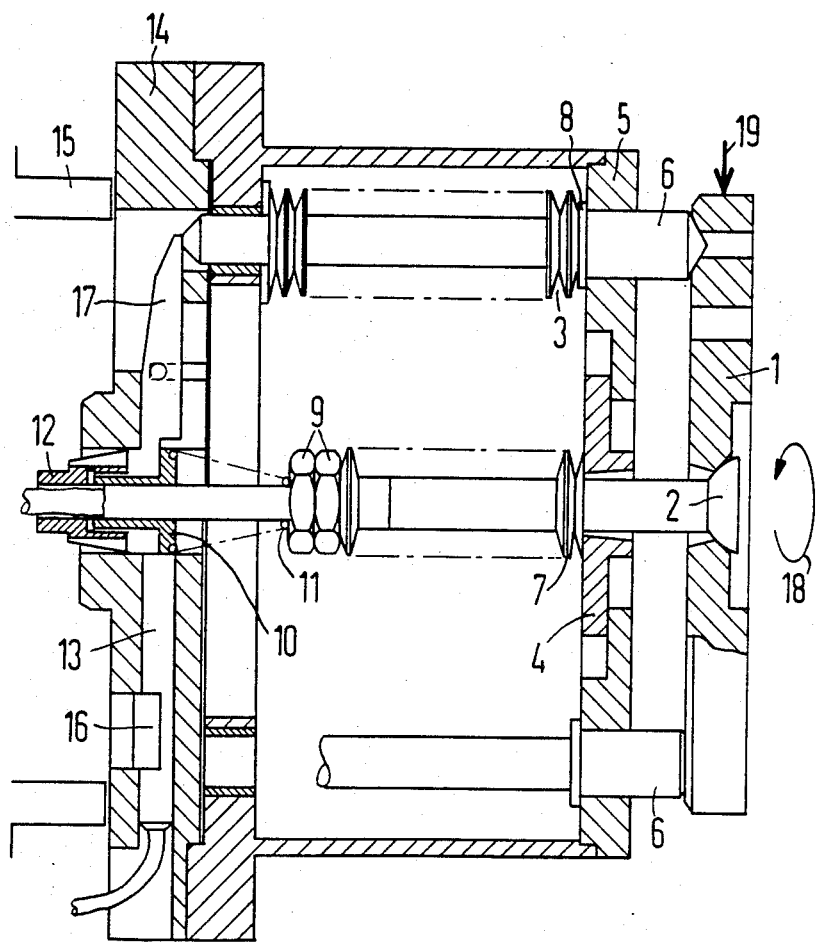

PROTECTION ARRANGEMENT FOR INDUSTRIAL ROBOTICS

BACKGROUND OF THE INVENTION

This invention relates to a protection arrangement for industrial robots and, more particularly, it relates to a mechanical overload protection device including a switching device for deactivation of a robot in response to traction and compressional forces.

During the operation and in particular during the programming of industrial robots (IR) for setting them up, errors in the IR control or operating errors by the programmer lead to collisions of the IR gripper with the environment such as ambient apparatus, causing damage to the gripper, the environment, or both.

Although the controls for the IR include fuses against overload, their response is either delayed or not effective at all. In general, these fuses serve to protect primarily the drives of the IR. Sensitive gripper devices may be significantly damaged before these fuses respond.

Selection of a rated braking point between the IR flange and the gripper represents another solution.

A protection arrangement is disclosed in patent application No. P 33 33 979.1, which responds when moments or traction forces act upon the protection flange via the gripper of the IR. The connection between the IR and the tool is established by means of at least three flanges, whereby two of these flanges are flexibly connected causing them to tilt relative to one another when a specific transverse forces act upon the tool, thus activating a switching configuration for deactivating the IR.

An object of the present invention is to provide a protection arrangement which activates a switching configuration to deactivate the IR in case traction and pressure forces, as well as bending and torsion moments act upon the flange.

SUMMARY OF THE INVENTION

This object and other features are achieved through the characteristics set forth in the mechanical features of the protection arrangement. An advantage of the structure by including multiple springs is that the different characteristics of the springs for the pins may be selected in relation to one another according to the various external forces acting upon the gripper and also the protection flange.

An additional advantage results from setting the activating element in such a manner as to be responsive to the deflection of the protection flange and thus the pins by e.g. several tenths of a millimeter. As a result the coupling maneuverability of the IR to e.g. alternate grippers is greatly facilitated, since the protection flange can deflect vertically to the robotic flange.

BRIEF DESCRIPTION OF THE DRAWING

The invention will be more fully appreciated including additional objects and advantages by reading the following description in conjunction with the sole drawing showing an illustrative embodiment of a protection arrangement in cross-sectional view which employs the principles of the invention.

DETAILED DESCRIPTION

In the sole FIGURE, a protection flange 1 is forced and held against pins 6 arranged on a divided circle with anchor rod 2 by means of springs 7 (plate springs) supported by plates 4 and 5. The illustrative embodiment includes four of these pins. The ends of pins 6 on which flange 1 is held are of a generally conical (or spherically or ball shaped) configuration. Pins 6 can be shifted in an axial direction and are pressed against flange 5 by the prestressed springs 3 (plate springs) under compression. The adjustment of spring sets 7 and 3, that is for anchor rod 2 as well as for pins 6, is performed in a manner in which pins 6 with their collar 8 always press against plate 5.

The adjustment of springs 3 for pins 6 is performed by means of the number, type and layering of plate springs. The adjustment of springs 7 of the anchor rod can also be performed by changing the location of the two nuts 9. On the left end of anchor rod 2, an activating element 10 has been arranged which is pressed by means of spring 11 against the sliding member 12 secured to anchor rod 2. The position of the activating element 10 in relation to the flange 14 is determined by the position of sliding member 12.

The activating element 10 controls a non-contact, or proximity, switch 13. Via flange 14 the protection arrangement is connected to flange 15 of the IR (not shown). A clamping configuration has been identified with 16 which sets the spacing distance of the non-contact switch 13 with respect to the activating element 10. Reference numeral 17 indicates an activating lever which transfers the movement of pins 6 to the activating element 10.

Through traction and bending moments acting upon the protection flange 1, anchor rod 2 and thus activating element 10 are shifted to the right. The non-contact switch is activated and closed producing e.g. an "EMERGENCY OFF" status.

Through the effects of a torsion moment, indicated by arrow 18, or those of transverse forces 19, protection flange 1 moves away from the conical tips of pins 6, thus shifting activating element 10.

In response to excessive pressure forces (compression forces) acting on the protection flange 1, pins 6 are deflected to the left and produce via lever 17 a shifting of the activating element 10.

Excessive torsion moment or force, causing the protection arrangement to respond, is determined by the preset compressional bias force of springs 3 and the characteristics of springs 7 of anchor rod 2 and the angle of opening of the conic ends of pins 6.

The forces and moments causing the protection configuration to respond to protect the IR gripper are set by the prestressing tension and the characteristics of springs 7 of anchor rod 2 and plate springs 3 of pins 6.

There has thus been shown and described a protection arrangement which fulfills all the objects and advantages sought therefor. Many changes, modifications, variations and other uses and applications of the subject invention will, however, become apparent to those skilled in the art after considering the specification and the accompanying drawing which disclose preferred embodiment thereof. All such changes, modifications, variations and other uses and applications which do not depart from the spirit and scope of the invention are deemed to be covered by the invention which is limited only by the claims which follow.

We claim:

1. A protection arrangement for industrial robots against consequences resulting from collisions during operating and programming of the industrial robot, the protection arrangement including a flange connected to a movable portion of the industrial robot, the protection arrangement comprising a switching arrangement including a switch responsive to tensional and compressional forces for deactivating the industial robot, the switching arrangement also response to bending and torsion forces acting upon the flange of the industrial robot for deactivating the industrial robot, the protection arrangement further comprising a protection flange, an anchor pin, and a plurality of movable pins extending from the flange of the industrial robot and having one end mechanically contacting the protection flange, each movable pin having one of a set of first springs located thereon and providing a force at the one end for mechanical contact against the protection flange while the anchor pin provides an opposite force to hold the protection flange in a position against the plurality of pins, first mechanical coupling means located on the anchor rod in the vicinity of the flange of the industrial robot responsive to displacement of the anchor rod in a first detection for operating the switch for deactivating the industrial robot, and second mechanical coupling means responsive to displacement of at least one movable pin in a second direction for operating the switch for deactivating the industrial robot.

2. A protection arrangement according to claim 1, wherein the one ends of the plurality of movable pins against which the protection flange is pulled each have a conical shape and can be shifted in axial direction and each pin includes a collar for compression its one of the set of the first springs against the flange of the industrial robot.

3. A protection arrangement according to claim 1, wherein the second mechanical coupling means comprises an activating element, a sliding member, at least one activating lever disposed to pivot between a movable pin and the activating member.

4. A protection arrangement according to claim 1, wherein the anchor rod includes an arrangement comprising two lock nuts and a spring for adjusting a compressional force on the spring corresponding to the opposite force.

5. A protection arrangement according to claim 1, wherein the set of first springs comprises plate springs whose number, type and manner of layering determines the value of the force for deactivating the industrial robot.

6. A protection arrangement according to claim 1, wherein the switch comprises a non-contact proximity switch.

* * * * *